Sept. 2, 1924.

T. J. McCLUSKEY

BEARING

Filed Feb. 20, 1923　　2 Sheets-Sheet 1

1,506,856

Witnesses
Charles H. Buckler
George A. Gruss

Inventor
Thomas J. McCluskey
By Joshua R. H. Potts
His Attorney

Sept. 2, 1924.                                           1,506,856
T. J. McCLUSKEY
BEARING
Filed Feb. 20, 1923          2 Sheets-Sheet 2

Witnesses
Charles H. Buckler
George A. Gruss

Inventor
Thomas J. McCluskey
By Joshua R. H. Potts
His Attorney

Patented Sept. 2, 1924.

1,506,856

UNITED STATES PATENT OFFICE.

THOMAS J. McCLUSKEY, OF GLOUCESTER, NEW JERSEY.

BEARING.

Application filed February 20, 1923. Serial No. 620,186.

*To all whom it may concern:*

Be it known that I, THOMAS J. MCCLUS-KEY, a citizen of the United States, residing at Gloucester, in the county of Camden and State of New Jersey, have invented certain new and useful Improvements in Bearings, of which the following is a specification.

My invention relates to bearings, more especially to ball bearings and has for its object to provide a bearing which will reduce friction to a minimum and which may be easily assembled.

This object, and other advantageous ends which will be described hereinafter, I attain in the following manner, reference being had to the accompanying drawings in which—

Figure 1:
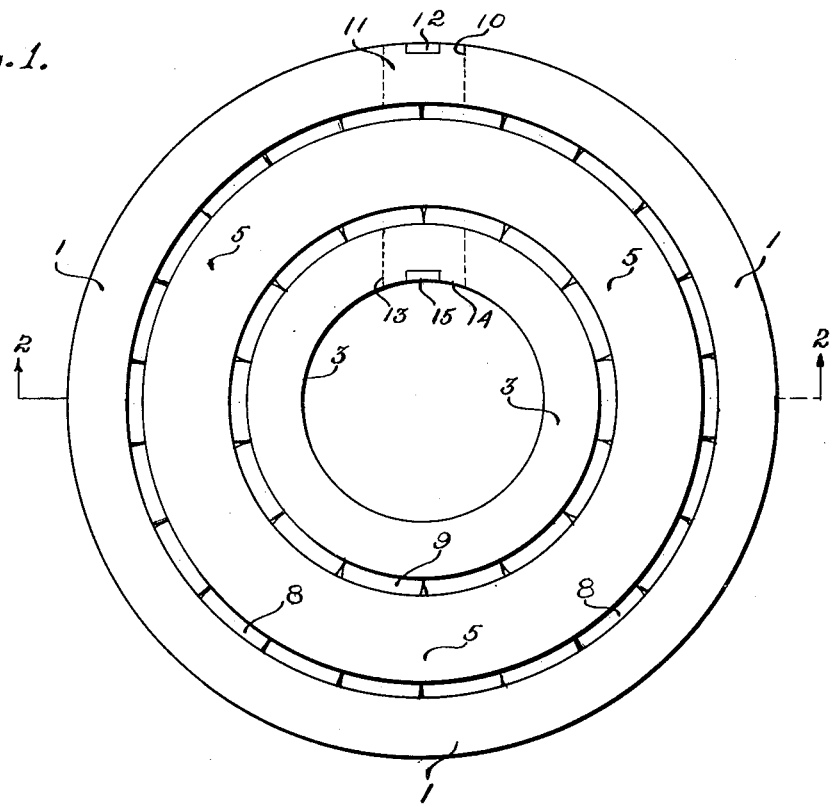
Figure 2:
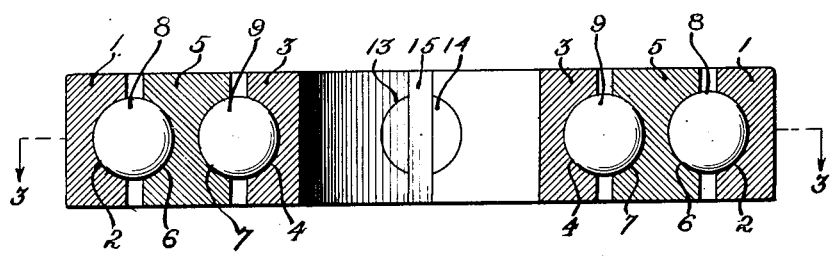
Figure 3:
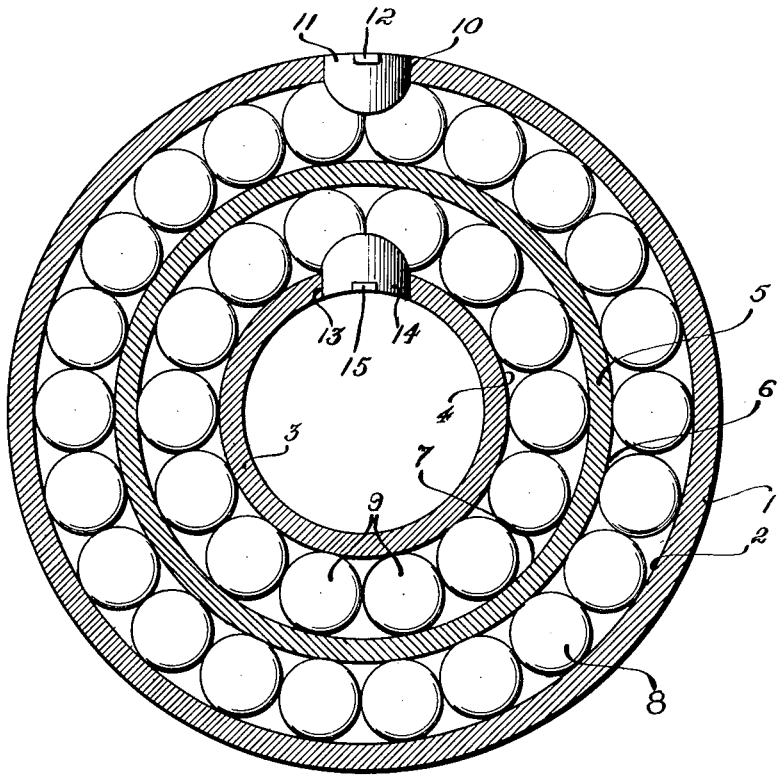
Figure 4:
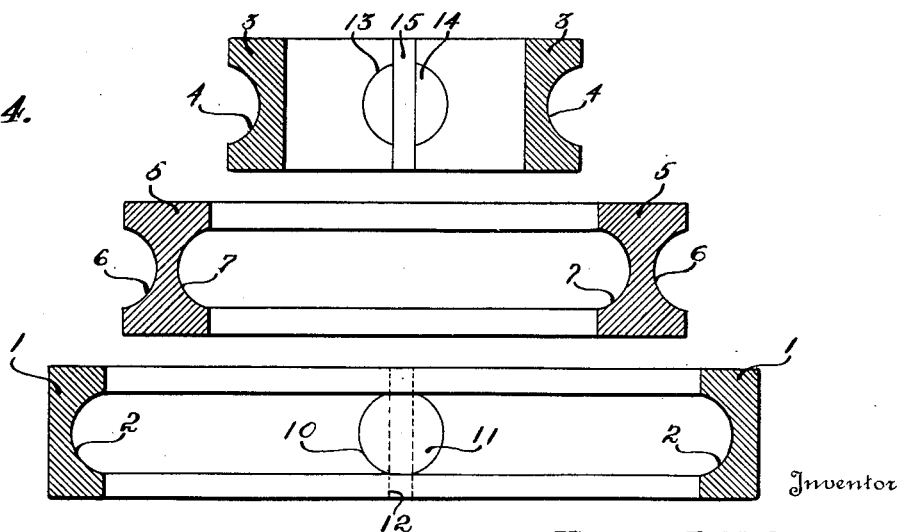

Figure 1 is a plan view of a bearing constructed in accordance with my invention, Figure 2 a section on line 2—2 of Figure 1, Figure 3 a section on line 3—3 of Figure 2, and Figure 4 a disassembled view of the rings, the balls being omitted.

Referring to the drawings, 1 represents the outer ring having a ball race 2 on its inner side. An inner ring 3 disposed within the outer ring has a ball race 4 on its outer side. An intermediate ring 5 is disposed between the inner and outer ring and has a ball race 6 on its outer side and a ball race 7 on its inner side. A set of balls 8 is placed between races 2 and 6 and a set of balls 9 is placed between races 4 and 7. To place balls 8 between the outer and intermediate ring I provide a ball inlet 10 in the outer ring communicating with its race 2, so that balls may be passed therethrough in position between the outer and intermediate ring. The ball inlet is closed by a block 11 which has a key 12 fitting in a keyway in the ring to limit its inward and turning movement and thereby keep it in proper position. The block in this position forms a part of ball race 2. I provide a ball inlet 13, similar to ball inlet 10, in the inner ring, which communicates with its race 4 so that the balls may pass therethrough in position between the rings. The ball inlet is closed by a block 14 which has a key 15 fitting in a keyway in the ring, to limit its outward and turning movement and thereby hold it in proper position. The block in this position forms a part of ball race 4.

To use my bearing a shaft is passed through inner ring 3 and makes a tight fit therewith. The bearing and shaft are then placed in a support so the outer ring 1 will make a tight fit with the support. The tight fit of the inner ring with the shaft prevents block 13 from moving out of position and thus forms a practically integral part of ring 3 so that when balls 9 roll around the inner ring they will have a continuous ball race to ride on. The tight fit of the outer ring with the support has a similar effect on block 11 and keeps it in position so that when balls 8 roll on the outer ring they will have a continuous race to ride on.

When my bearing is in use, friction is greatly reduced for the reason that binding of the balls is not likely to occur at the same time in the two sets. If binding of balls occurs in one set the other set will take care of the friction and vice versa. My improved bearing is of especial value when a shaft rotates in one direction and a wheel rotatably mounted on the shaft rotates in the opposite direction. Balls 9 reduce friction of the shaft and balls 8 reduce friction of the rotatably mounted and oppositely rotating wheel.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claim.

Having thus described my invention, what I claim and desire to secure by Letters Patent is:—

A bearing including an outer ring having a race on its inner side, a ball inlet communicating with the race and keyways, on its outer side at opposite sides of the inlet, disposed transversely to the race; an inner ring having a race on its outer side, a ball inlet communicating with the race and keyways, on its inner side at opposite sides of the ball inlet, disposed transversely to the race; an intermediate ring disposed between the inner and outer ring and having a race on its outer and inner sides; a set of balls in the races between the outer and intermediate ring; a set of balls in the races between the inner and intermediate ring; a block having one of its sides forming a race across each inlet and the other side provided with a keyway disposed transversely to the race, and a key in the keyway of each block extending within the keyway in the ring for locking the block in position.

In testimony whereof I have signed my name to this specification in the presence of two subscribing witnesses.

THOMAS J. McCLUSKEY.

Witnesses:
  CHAS. E. POTTS,
  ELIZABETH GARBE.